United States Patent
Kumar (10) Patent No.: US 7,606,353 B2
(45) Date of Patent: Oct. 20, 2009

(54) SIGNAL AMPLITUDE AND CLOCK SIGNAL FREQUENCY SELECTION

(75) Inventor: Anil K. Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 10/668,137

(22) Filed: Sep. 22, 2003

(65) Prior Publication Data

US 2005/0063457 A1   Mar. 24, 2005

(51) Int. Cl.
*H04M 11/06*   (2006.01)
(52) U.S. Cl. ............... 379/93.01; 340/10.34; 340/10.52; 348/555; 370/493; 375/222; 379/1.04; 379/346; 455/17; 455/276.1; 725/129
(58) Field of Classification Search ................ 379/346, 379/1.04, 93.01; 370/493; 348/555; 340/10.34, 340/10.52; 455/17, 276.1; 725/129
See application file for complete search history.

(56) References Cited

U.S. PATENT DOCUMENTS

| | | | |
|---|---|---|---|
| 4,882,749 A * | 11/1989 | Zuk ........................... 379/346 |
| 5,204,979 A * | 4/1993 | Schenkyr et al. .......... 455/276.1 |
| 5,517,188 A * | 5/1996 | Carroll et al. ............ 340/10.52 |
| 6,249,212 B1 * | 6/2001 | Beigel et al. ............. 340/10.34 |
| 6,426,961 B1 * | 7/2002 | Nimmagadda ............... 370/493 |
| 6,654,958 B1 * | 11/2003 | Roberts et al. .............. 725/129 |
| 6,876,725 B2 * | 4/2005 | Rashid-Farrokhi et al. . 379/1.04 |
| 6,922,547 B2 * | 7/2005 | O'Neill et al. ................. 455/17 |
| 6,987,541 B2 * | 1/2006 | Komatsu ..................... 348/555 |

* cited by examiner

*Primary Examiner*—Gerald Gauthier (57) ABSTRACT

In one embodiment, a method is provided. The method of this embodiment may include, in response, at least in part, to receipt at a first node of a request issued from a second node to change from one mode of operation to another mode of operation, selecting an amplitude of a signal to be propagated between the first node and the second node during the another mode of operation. The amplitude of the signal may be different from another amplitude of the signal during the one mode of operation. The method of this embodiment also may include, in response, at least in part, to the receipt of the request, selecting a frequency of a clock signal to be supplied in the first node during the another mode of operation. The frequency may be different from another frequency of the clock signal during the one mode of operation.

27 Claims, 3 Drawing Sheets

SIGNAL AMPLITUDE AND CLOCK SIGNAL FREQUENCY SELECTION

FIELD

This disclosure relates to selecting signal amplitude and clock signal frequency.

BACKGROUND

In one conventional digital subscriber line (DSL) network, the network includes customer premises equipment (CPE) coupled via a subscriber line to a telephone central office (CO). The CPE and CO exchange data and/or commands via the subscriber line. Various conventional techniques may be employed to reduce the power consumed and heat dissipated by the network. For example, in one conventional technique, if the actual exchange rate of data and commands between the CO and CPE falls below a predetermined minimum threshold for a predetermined period of time, the amplitude of current flowing through the subscriber line between the CPE and CO is reduced, and the CO enters a low power mode of operation in which the CO consumes relatively less power and dissipates relatively less heat compared to when this actual exchange rate is higher than the threshold.

In this conventional technique, even if this actual exchange rate falls below the threshold for the predetermined period of time, the CPE may continue to consume and dissipate essentially the same amounts of power and heat, respectively, that the CPE may consume and dissipate when this actual exchange rate is above the threshold. Disadvantageously, this may result in the CPE and/or the DSL network consuming more power and/or dissipating more heat during a period of relatively reduced exchange of data and/or commands between the CO and CPE than may be desirable.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
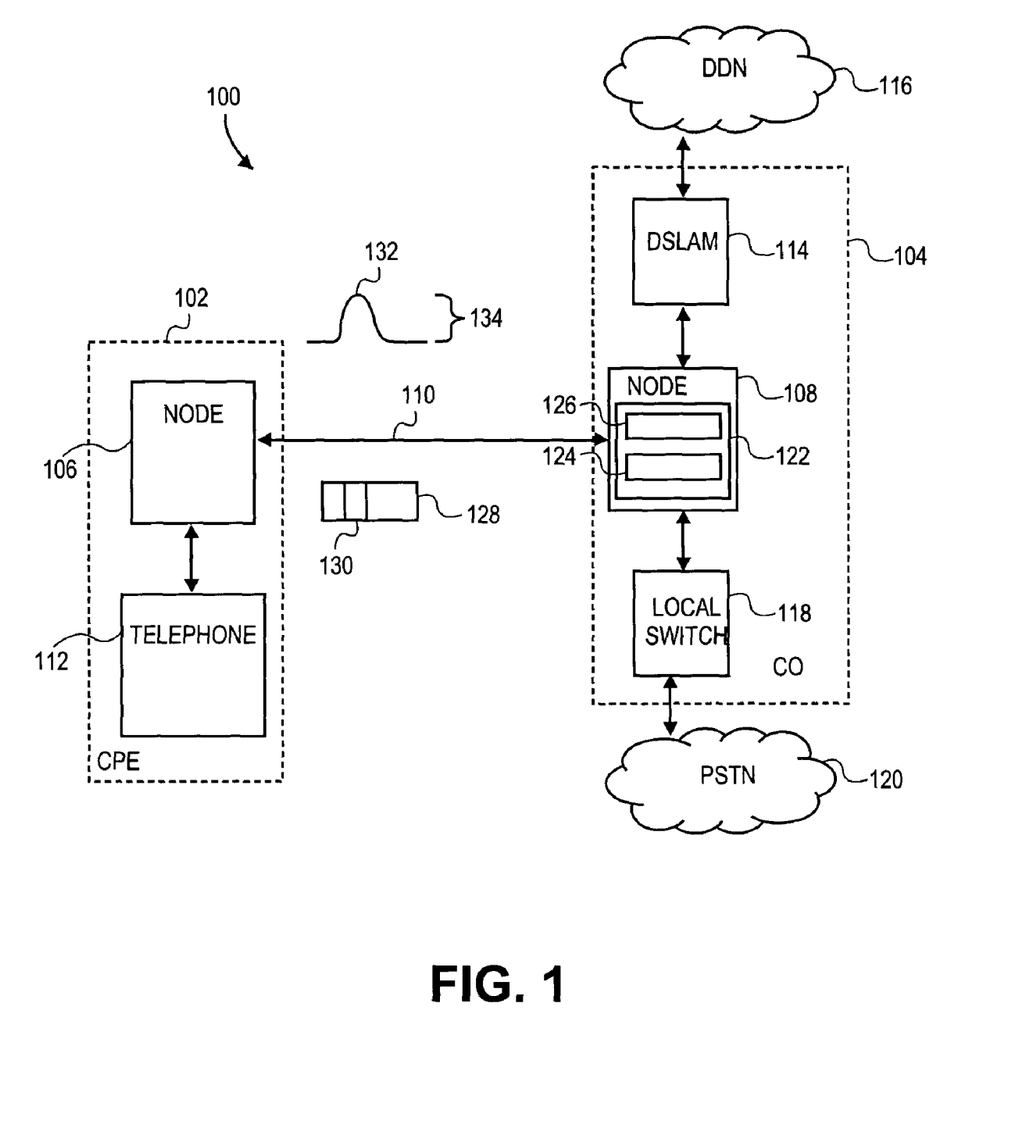
FIG. 1 illustrates a network.

FIG. 1 illustrates one embodiment of a network 100. In this embodiment, network 100 may be, for example, a DSL network, that may comprise, for example, CPE 102 and CO 104. CPE 102 may comprise network node 106, and CO 104 may comprise network node 108. In this embodiment, nodes 106 and 108 may be communicatively coupled together via telephone subscriber line 110 that may comprise a pair of twisted copper wires used in conventional telephonic voice communication, such as, for example, a plain old telephone service (POTS) twisted wire pair communication line.

CO 104 also may comprise a local switch 118, via which node 108 may be communicatively coupled to public switched telephone network (PSTN) 120. Local switch 118 may comprise, for example, a local telephonic switch bank. Additionally, CO 104 may comprise a DSL access multiplexer (DSLAM) 114, via which node 108 may be coupled to digital data network (DDN) 116. DDN 116 may comprise, for example, a private data network or public data network, such as, the Internet.

In this embodiment, node 108 may comprise, for example, DSL modem operative circuitry 122. Operative circuitry 122 may comprise DSL splitter circuitry 124 and DSL modem transceiver circuitry 126.

As used herein, "circuitry" may comprise, for example, singly or in any combination, hardwired circuitry, programmable circuitry, state machine circuitry, and/or memory that may comprise program instructions that may be executed by programmable circuitry.

In operation of network 100, node 106 and node 108 may communicate with each other by generating and exchanging frames in a manner that is compatible and/or complies with an asymmetric DSL (ADSL) communication protocol, such as, for example, an ADSL communication protocol described in "Asymmetric Digital Subscriber Line (ADSL) Transceivers—2 (ADSL2)," Series G: TRANSMISSION SYSTEMS AND MEDIA, DIGITAL SYSTEMS AND NETWORKS, Digital sections and digital line system—Access networks, Recommendation G992.3, International Telecommunication Union (ITU)—Telecommunication Standardization Sector, published July 2002 (hereinafter referred to as the "ITU Standard"), and/or later developed versions of the ITU Standard. Of course, without departing from this embodiment, node 106 and node 108 may communicate with each other by generating frames and exchanging these frames between nodes 106 and 108 in a manner that may be compatible with and/or comply with other and/or additional DSL and/or other communication protocols. As used herein, a "frame" means a sequence of one or more symbols and/or values that may be encoded by one or more signals transmitted from at least one sender to at least one receiver.

POTS signals may also be exchanged, along with such frames, between nodes 106 and 108 via line 110. For example, telephone 112 may be communicatively coupled to node 106. Telephone 112 may generate POTS signals that may be transmitted via node 106 and line 110 to node 108. Splitter circuitry 124 comprised in modem circuitry 122 may transmit such POTS signals to local switch 118. Switch 118 then may transmit the POTS signals to PSTN 120.

Likewise, splitter circuitry 124 may receive POTS signals from PSTN 120 via local switch 118. Splitter circuitry 124 may transmit such POTS signals to node 106 via line 110. Node 106 may transmit the received POTS signals to telephone 112.

Splitter circuitry 124 also may transmit frames issued from node 106 and received by node 108 to modem transceiver circuitry 126. Circuitry 126 may recover data and/or commands comprised in such frames, and may transmit such data and/or commands via DSLAM 114 to DDN 116.

Likewise, node 108 may receive data and/or commands from DDN 116 via DSLAM 114 that are destined for node 106. Circuitry 126 may generate and transmit to node 106 via line 110 one or more frames that may comprise such data and/or commands.

Figure 2:
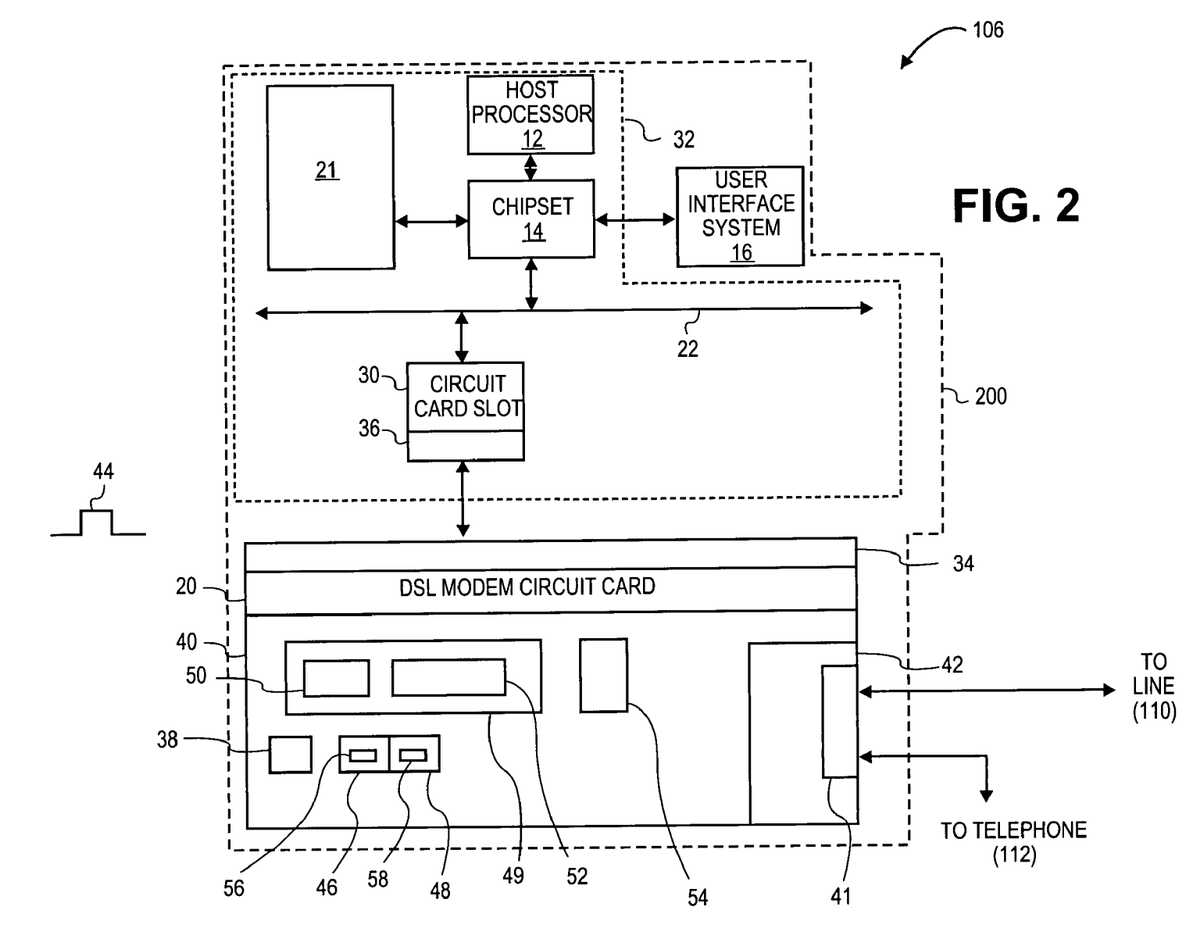
FIG. 2 illustrates a system embodiment.

FIG. 2 illustrates a system embodiment that may be comprised in node 106. In this embodiment, node 106 may comprise operative circuitry 200. Operative circuitry 200 may include a host processor 12 coupled to a chipset 14. Host processor 12 may comprise, for example, an Intel® Pentium® III or IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, computer-readable system memory 21, and a user interface system 16 to each other and to a bus system 22. Chipset 14 may also include an I/O bridge/hub system (not shown) that may couple the host bridge/bus system to bus 22. Chipset 14 may comprise one or more integrated circuit chips, such as those selected from integrated circuit chipsets commercially available from the Assignee of the subject application (e.g., graphics memory and I/O controller hub chipsets), although one or more other integrated circuit chips may also, or alternatively, be used. User interface system 16 may comprise, e.g., a keyboard, pointing device, and display system that may permit a human user to input commands to, and monitor the operation of, circuitry 200.

Bus 22 may comprise a bus that complies with the Peripheral Component Interconnect (PCI) Local Bus Specification, Revision 2.2, Dec. 18, 1998, available from the PCI Special Interest Group, Portland, Oreg., U.S.A. (hereinafter referred to as a "PCI bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 instead may comprise a bus that complies with the PCI Express™ Base Specification Revision 1.0, published Jul. 22, 2002, available from the PCI Special Interest Group, Portland, Oreg., U.S.A. (hereinafter referred to as a "PCI Express™ bus"). Yet further alternatively, bus 22 may comprise other types and configurations of bus systems.

Processor 12, system memory 21, chipset 14, PCI bus 22, and circuit card slot 30 may be comprised in a single circuit board, such as, for example, a system motherboard 32. Circuit card slot 30 may comprise a PCI expansion slot that comprises a PCI bus connector 36. Connector 36 may be electrically and mechanically mated with a PCI bus connector 34 that is comprised in DSL modem circuit card 20. Slot 30 and card 20 may be constructed to permit card 20 to be inserted into slot 30. When card 20 is properly inserted into slot 30, connectors 34 and 36 may become electrically and mechanically coupled to each other. When connectors 34 and 36 are so coupled to each other, operative circuitry 40 in card 20 becomes electrically coupled to bus 22.

When circuitry 40 is electrically coupled to bus 22, host processor 12 may exchange data and/or commands with circuitry 40, via chipset 14 and bus 22, that may permit host processor 12 to control and/or monitor the operation of circuitry 40. Circuitry 40 may include analog front end (AFE) circuitry 42, computer-readable memory 38, clock signal generator circuitry 49, clock signal gating circuitry 54, computer-readable memory 46, and computer-readable memory 48.

Memory 21 and/or memory 38 may comprise read only, mass storage, and/or random access memory. Memory 46 and/or memory 48 may comprise mass storage and/or random access memory, such as, for example, one or more respective random access memory registers and/or other storage. Although memory 38, memory 46, and memory 48 are shown in FIG. 2 as comprising separate memories, without departing from this embodiment, one or more of memories 38, 46, and/or 48 may be combined.

Memory 21 and/or memory 38 may store program instructions that may be executed by processor 12 and/or circuitry 40. The execution of these program instructions by processor 12 and/or circuitry 40 may result in, for example, processor 12 and/or circuitry 40 executing operations that may result in processor 12, circuitry 40, circuitry 200, and/or node 106 carrying out the operations described herein as being carried out by processor 12, circuitry 40, circuitry 200, and/or node 106.

Without departing from this embodiment, instead of being comprised in card 20, all or a portion of operative circuitry 40 may be comprised in other structures, systems, and/or devices that may be, for example, comprised in motherboard 32, coupled to bus 22, and exchange data and/or commands with other components of operative circuitry 200. For example, without departing from this embodiment, chipset 14 may comprise one or more integrated circuits that may comprise all or a portion of operative circuitry 40. Other modifications and/or variations are also possible without departing from this embodiment.

For example, without departing from this embodiment, all or a portion of circuitry 40 and/or circuitry 200 may be comprised in one or more portable (e.g., not shown laptop and/or notebook) and/or desktop computer systems (not shown). Alternatively or additionally, without departing from this embodiment, all or a portion of circuitry 40 and/or circuitry 200 may be comprised in one or more residential gateway (not shown) and/or set top box systems (not shown). Other and/or additional modifications and/or variations are possible without departing from this embodiment.

In this embodiment, AFE circuitry 42 may comprise modem transceiver/line driver circuitry 41 that may capable of being communicatively coupled to line 110 and to telephone 112. Also in this embodiment, circuitry 42 and/or circuitry 41 may comprise not shown DSL modem splitter circuitry. Telephone 112 may generate POTS signals that may be transmitted to circuitry 41. The splitter circuitry may transmit such POTS signals to node 108 via line 110. Likewise, circuitry 41 may receive POTS signals from node 108 via line 110, and the splitter circuitry may transmit such received POTS signals to telephone 112.

Additionally, transceiver circuitry 42 and/or circuitry 41 may generate one or more frames intended to be received by node 108. These frames may be transmitted via the splitter circuitry comprised in circuitry 42 and/or circuitry 41 to node 108. Likewise, one or more frames transmitted to node 106 from node 108 via line 110 may be transmitted to circuitry 42 via circuitry 41 and/or the splitter circuitry.

Of course, although splitter circuitry has been described as being comprised in transceiver circuitry 42, splitter circuitry may not be comprised in circuitry 42 and/or may be comprised in other circuitry and/or components in node 106, without departing from this embodiment. Additionally, depending upon the particular functionality of circuitry 40 and/or circuitry 122, the splitter circuitry that may be comprised in circuitry 40 and/or circuitry 122 may be eliminated from network 100, without departing from this embodiment.

Clock generator circuitry 49 may comprise phase lock loop (PLL) circuitry 50 and frequency divider circuitry 52. PLL circuitry 50 may receive, as inputs, a reference clock signal generated by a not shown oscillator circuit, and an output clock signal 44 generated by generator circuitry 49. PLL circuitry 50 may generate, as an output, based at least in part upon output clock signal 44 and the reference clock signal, a PLL output clock signal that may be supplied, as an input, to clock frequency divider circuitry 52. Divider circuitry 52 may receive, as another input, numerical value 58 that may be stored in memory 48. Circuitry 52 may generate, as an output, an output clock signal whose frequency may be equal to the result of dividing the frequency of the PLL output clock signal by numerical value 58. That is, if the frequency of the PLL output clock signal is equal to M, and numerical value 58 is equal to N, then the frequency of the output clock signal generated by circuitry 52 may be equal to M divided by N. This output clock signal generated by circuitry 52 may be output from circuitry 49 as clock signal 44.

Clock signal 44 may be supplied, as an input, to clock signal gating circuitry 54. Circuitry 54 also may receive, as another input, value 56 that may be stored in memory 46. Based at least in part upon value 56, circuitry 54 may either permit clock signal 44 to be output from circuitry 54, or may prevent clock signal 44 from being output from circuitry 54. For example, in this embodiment, at any given time, gating circuitry 54 may be capable of operating in one of two modes of operation. If value 56 is equal to one or more predetermined values, circuitry 54 may operate in a mode of operation in which clock signal 44 may be output from circuitry 54, and clock signal 44 may be propagated to other circuitry that may be circuitry 40. Conversely, if value 56 is equal to one or more other predetermined values, circuitry 54 may operate in a different mode of operation in which clock signal 44 may be prevented from being output from circuitry 54. For example, in this embodiment, in this different mode of operation, the output of circuitry 54 may enter a high impedance state that essentially may decouple the output of circuitry 54 from the remainder of circuitry 40, and prevent clock signal 44 from being propagated from circuitry 54 to other circuitry that may be comprised in circuitry 40.

If clock signal 44 is permitted by circuitry 54 to be output from circuitry 54, clock signal 44 may be provided to sequential logic circuitry that may be comprised in circuitry 40, and clock signal 44 and/or other clock signals that may be derived from clock signal 44 may be used as one or more input clock signals by this sequential logic circuitry. This sequential logic circuitry may comprise, for example, complementary metal oxide semiconductor (CMOS) circuitry. Conversely, if clock signal 44 is prevented by circuitry 54 from being output from circuitry 54, this sequential logic circuitry may not receive these one or more input clock signals. This may prevent the sequential logic circuitry from changing state, and this may prevent the CMOS circuitry from consuming additional electrical power so long as the CMOS circuitry does not receive these one or more input clock signals. This may substantially reduce both the amount of electrical power consumed, and the amount of heat dissipated by circuitry 40.

Similarly, if clock signal 44 is output from circuitry 54, the frequency of the input clock signals received by this sequential logic circuitry in circuitry 40 may be based upon, at least in part, the frequency of clock signal 44. Thus, the speed with which this sequential logic circuitry may be capable of changing state may depend, at least in part, to the frequency of clock signal 44. Thus, the amount of electrical power consumed, and the heat dissipated by the CMOS circuitry comprised in circuitry 40 may depend, at least at least in part, upon the frequency of clock signal 44. For example, in this embodiment, if the frequency of clock signal 44 is relatively high, then the amount of electrical power consumed, and the heat dissipated by this CMOS circuitry may be relatively high. Conversely, in this embodiment, if the frequency of clock signal 44 is relatively low, then the amount of electrical power consumed, and the heat dissipated by this CMOS circuitry may be relatively low.

Of course, operation of other and/or additional circuitry in circuitry 200 and/or circuitry 40 may be based, at least in part, upon clock signal 44. Accordingly, the amount of electrical power consumed, and heat dissipated by this other and/or additional circuitry may depend, at least in part, upon whether clock signal 44 is output from circuitry 54, and if clock signal 44 is output from circuitry 54, the frequency of clock signal 44.

In this embodiment, circuitry 41 may generate, and propagate via line 110 to node 108, one or more line driving current signals (collectively or singly referred by as "current signal 132"). Current signal 132 may have amplitude 134. Current signal 132 is shown symbolically in FIG. 1. Thus, current signal 132 may not have the particular waveform shown in FIG. 1, without departing from this embodiment. In this embodiment, in order to transmit one or more frames from node 106 to node 108 via line 110, amplitude 134 of current signal 132 may be held constant by circuitry 41, and circuitry 41 may vary the amplitude of one or more voltage signals that may be generated, and propagated via line 110 to node 108, by circuitry 41. The varying of amplitude of the one or more voltage signals may encode the one or more values and/or symbols that may be comprised in one or more frames. Circuitry 126 may decode, based at least in part upon the amplitude of the one or more voltage signals, these one or more values and/or symbols. Similar techniques to the above techniques that may be employed by circuitry 41 to generate and transmit a frame to node 108 may be employed by circuitry 126 to generate and transmit a frame to node 106.

Depending upon amplitude 134, the amount of electrical power consumed, and heat dissipated by generation and propagation of current signal 132 via line 110 may vary. For example, if amplitude 134 is relative high, then the amount of electrical power consumed, and heat dissipated by generation and propagation of current signal 132 via line 110 may be relatively high, and this may increase the amount of electrical power consumed, and heat dissipated by network 100. Conversely, if amplitude 134 is relatively low, then the amount of electrical power consumed, and heat dissipated by generation and propagation of current signal 132 via line 110 may be relatively low, and this may reduce the amount of electrical power consumed, and heat dissipated by network 100.

Figure 3:
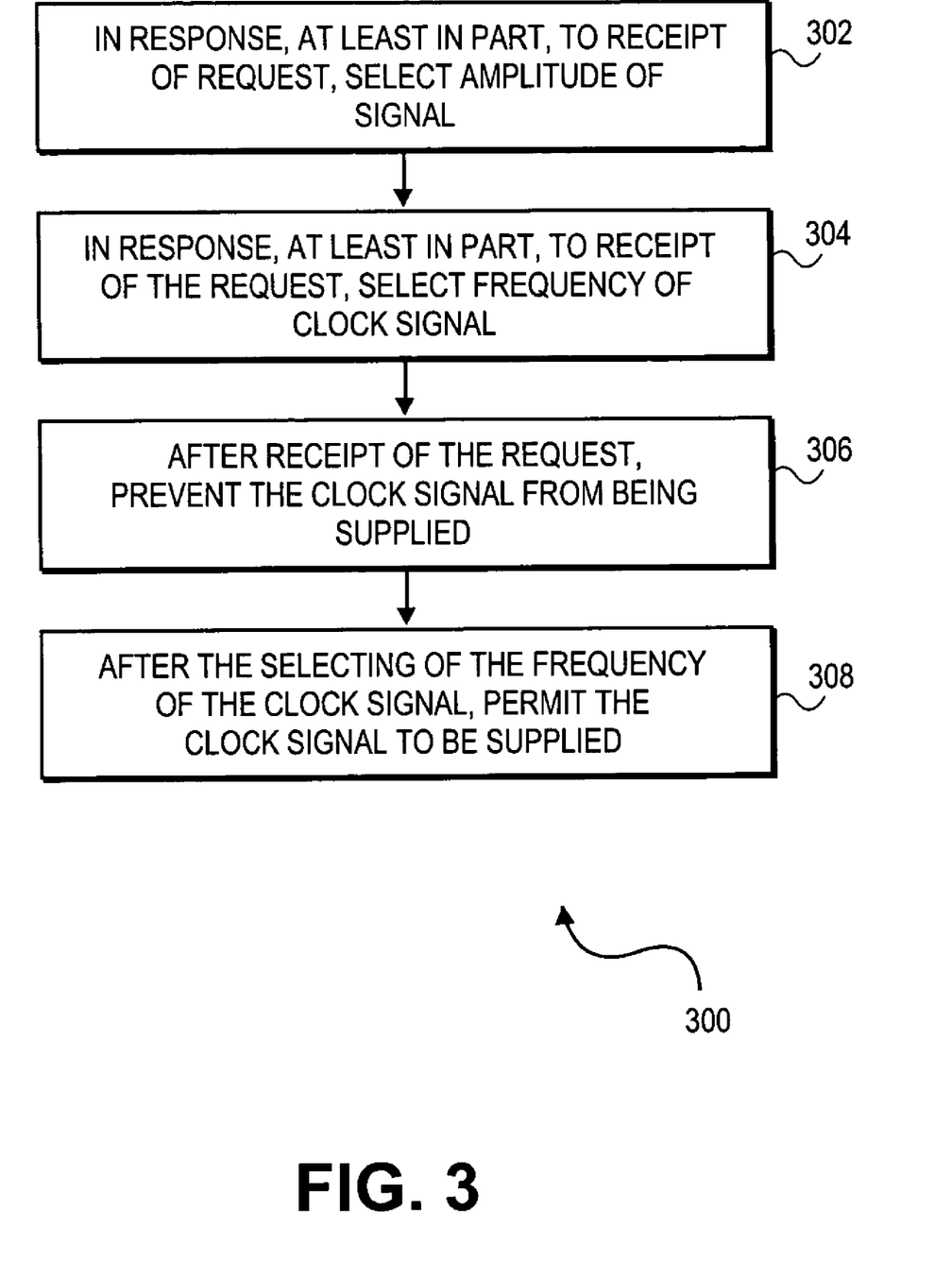
FIG. 3 is a flowchart illustrating operations that may be performed according to an embodiment.

With reference now being made to FIGS. 1-3, operations 300 that may be carried out in accordance with an embodiment will be described. After, for example, a reset of node 106, circuitry 200, and/or circuitry 40, the execution of one or more program instructions stored in memory 21 and/or memory 38 may result in circuitry 40 in node 106 initializing communication with circuitry 126 in node 108. In this embodiment, this initialization of communication between circuitry 40 and circuitry 126 may comprise, for example, a negotiation between circuitry 40 and circuitry 126 of one or more parameters specifying and/or identifying the manner in which one or more aspects of the communication are to be carried out between circuitry 40 and circuitry 126. During and/or as part of this negotiation, circuitry 40 and circuitry 126 may exchange via line 110 one or more frames that comprise one or more symbols and/or values that may comprise and/or encode these one or more parameters.

As a result, at least in part, of this negotiation, node 106, circuitry 40 may operate in a first mode of operation. In this first mode of operation, amplitude 134 of current signal 132 generated by circuitry 41 may be equal to a first predetermined amplitude of, for example, 150 milliamps (mA). Also in this mode of operation, clock signal 44 may be output from circuitry 54, and may have a frequency of, for example, 250 megahertz (MHz). Of course, without departing from this embodiment, amplitude 134 and/or the frequency of clock signal 44 may vary.

Thereafter, circuitry 126 may determine that an actual rate at which data and commands (e.g., encoded in one or more frames) have been received by node 108, during a preceding predetermined time period, from node 106, and/or an actual rate at which data and commands have been transmitted (e.g., via one or more frames) to node 106, during this predetermined time period, from node 108 may be less than a predetermined minimum threshold value. If circuitry 126 determines that this actual rate at which data and commands have been received by node 108 and/or that this actual rate at which data and commands have been transmitted to node 106 are less than this predetermined minimum threshold value, circuitry 126 may generate and issue to node 106 via line 110, one or more frames 128.

One or more frames 128 may contain one or more symbols and/or values that may comprise and/or encode a request 130 that circuitry 40 change from the first mode of operation to a second mode of operation. Circuitry 41 may receive one or more frames 128, and circuitry 42 and/or 40 may recover from one or more frames 128 request 130.

In response, at least in part, to receipt by circuitry 41 of request 130 from node 108, circuitry 40 may signal processor 12 that circuitry 41 in node 106 has received request 130 from node 108. In response, at least in part, to receipt of request 130 by node 106, host processor 12 may signal circuitry 40. This may result in circuitry 42 generating and transmitting to circuitry 126 via line 110, one or more frames that may contain an acknowledgement that node 106 has received request 130.

In response, at least in part, to receipt of this acknowledgement from node 106, circuitry 126 may generate and transmit to node 106 via line 110 one or more frames that may comprise and/or encode one or more symbols and/or values that may indicate and/or specify one or more parameters of the manner in which communication between node 106 and 108 is to be carried out when circuitry 40 is in the second mode of operation. These one or more parameters may indicate and/or specify, for example, among other things, one or more communication and/or transmission synchronization parameters. Circuitry 40 may recover these one or more parameters from these one or more frames, and in response, at least in part to receipt of these one or more parameters, circuitry 40 may signal processor 12 to indicate that node 106 has received these one or more parameters. After node 106 has received these one or more parameters, processor 12 may signal circuitry 40, memory 21, and/or memory 38. This may result in memory 21 and/or memory 38 storing one or more values that may correspond to and/or specify, at least in part, one or more parameters of the manner in which communication between node 106 and node 108 was carried out while circuitry 40 was in the first mode of operation.

Thereafter, in response, at least in part, to the receipt by node 106 of request 130, processor 12 and/or circuitry 40 may select amplitude 134 of current signal 132 to be propagated between node 106 and node 108 during the second mode of operation of circuitry 40 that is different from the amplitude 134 of current signal 132 during the first mode of operation of circuitry 40, as illustrated by operation 302 in FIG. 3. Contemporaneously with, prior to, or after, at least in part, the execution of operation 302, in response, at least in part, to the receipt by node 106 of request 130, processor 12 and/or circuitry 40 may select a frequency of clock signal 44 to be supplied in node 106 during the second mode of operation of circuitry 40 that is different from the frequency of clock signal 44 supplied in node 106 during the first mode of operation of circuitry 40, as illustrated by operation 304 in FIG. 3.

For example, in this embodiment, as a result of execution of operation 302, processor 12 and/or circuitry 40 may select amplitude 134 of current signal 132 to be propagated during between node 106 and node 108 during this second mode of operation, that is appropriate given the one or more parameters indicating and/or specifying the manner in which communication between nodes 106 and 108 is to be carried out during this second mode of operation, and that is less than the amplitude 134 of current signal 132 during the first mode of operation of circuitry 40. For example, in this embodiment, the amplitude 134 of current signal 132 that may be selected as a result of the execution of operation 302 may be 50 mA.

Also, for example, in this embodiment, as a result of execution of operation 304, processor 12 and/or circuitry 40 may select a frequency of clock signal 44 to be supplied in node 106 during this second mode of operation, that is appropriate given the one or more parameters indicating and/or specifying the manner in which communication between nodes 106 and 108 is to be carried out during this second mode of operation, and also that is less than the frequency of clock signal 44 during the first mode of operation of circuitry 40. For example, in this embodiment, the frequency of clock signal 44 that may be selected as a result of the execution of operation 304 may be 100 MHz.

In this embodiment, after the receipt of request 130 by node 106, and also after the execution of operations 302 and 304, processor 12 may signal circuitry 40 to change from a first mode of operation of circuitry 40 to a second mode of operation of circuitry 40. In response, at least in part, to the signaling of circuitry 40 by processor 12, circuitry 40 may signal processor 12 to indicate that circuitry 40 acknowledges that circuitry 40 is to change from its first operating mode to its second operating mode, and circuitry 40 may write into memory 46, as value 56, a predetermined value that may result in gating circuitry 54 preventing clock signal 44 from being output and supplied from circuitry 54 to circuitry 40. This may result in gating circuitry 54 preventing clock signal 44 from being output and supplied from circuitry 54 to circuitry 40, as illustrated by operation 306 in FIG. 3.

After or contemporaneously with the signaling by circuitry 40 of processor 12 to acknowledge that circuitry 40 is to change from its first operating mode to its second operating mode, processor 12 may again signal circuitry 40. This may result in circuitry 40 writing into memory 48, as value 58, a predetermined value that, when supplied to circuitry 52, may result in clock signal 44 having a frequency that may be equal to the frequency of clock signal 44 selected as a result of operation 304.

Thereafter, processor 12 may wait a predetermined time period sufficient to permit the frequency of clock signal 44 to stabilize, and processor 12 may then signal chipset 14 to issue one or more interrupt signals to circuitry 40. Additionally or alternatively, processor 12 may again signal circuitry 40. In either case, this may result in circuitry 40 writing into memory 46, as value 56, a predetermined value that may result in circuitry 54 again permitting clock signal 44 to be output and supplied from circuitry 54 to circuitry 40, and may also result in circuitry 40 signaling circuitry 42. This may result in gating circuitry 54 again permitting clock signal 44 to be output and supplied from circuitry 54 to circuitry 40 (as illustrated by operation 308 in FIG. 3), and also may result in circuitry 41 generating, and propagating via line 110 to node 108, current signal 132 having amplitude 134 selected as a result of operation 302. This may complete the changing of circuitry 40 from the first mode of operation to the second mode of operation. In this second mode of operation of circuitry 40, amplitude 134 of current signal 132 propagated via line 110 to node 108 may be equal to the amplitude 134 selected as a result of operation 302, and the frequency of clock signal 44 that may be output and supplied from circuitry 54 to circuitry 40 in node 106 may be equal to the frequency of clock signal 44 selected as result of operation 304. This may result in the amount of electrical power consumed, and heat dissipated by circuitry 40, if circuitry 40 is operating in its second mode of operation, to be less than the amount of electrical power consumed, and heat dissipated by circuitry 40, if circuitry 40 is operating in its first mode of operation.

Thereafter, in this embodiment, circuitry 40 may operate in the second mode of operation until a reset of circuitry 40 and/or receipt by node 106 of an additional request (not shown) from node 108 to change from the second mode of operation to either the first mode operation or to a third mode of operation. In this embodiment, in the third mode of operation, the frequency of clock signal 44 and/or amplitude 134 may be selected so as to permit circuitry 40 to consume even less electrical power, and to dissipate even less heat than may be consumed and dissipated, respectively, by circuitry 40 when circuitry 40 is operating in its second mode of operation.

In this embodiment, the frequency of clock signal 44 and the amplitude 134 of current signal 132 that may be selected as a result of operations 304 and 302, respectively, may be selected, based, at least in part, upon and/or as a result, at least in part, of request 130 and/or the one or more parameters of communication between node 106 and node 108 while circuitry 40 is operating in its second mode of operation. For example, in this embodiment, these one or more parameters and/or request 130 may specify and/or indicate one or more maximum transmission and/or reception rates for such communication. The frequency of clock signal 44 and the amplitude 134 of current signal 132 selected as a result of operations 304 and 302, respectively, may be previously determined empirically so as to permit these transmission and/or reception rates to be carried out in network 100, while also permitting the amount of electrical power that may be consumed, and the amount of heat that may be dissipated by circuitry 40 if circuitry 40 is operating in its second mode of operation to be reduced compared to the amount of electrical power that may be consumed, and the amount of heat that may be dissipated by circuitry 40 if circuitry 40 is operating in its first mode of operation. For example, in this embodiment, depending upon the particular manner in which circuitry 200 is implemented, the amount of electrical power consumed by circuitry 40 if circuitry 40 is operating in its first mode of operation may be about 100 mW. In contrast, if circuitry 40 is operating in its second mode of operation, the amount of electrical power consumed may be about 25 mW.

Thus, a system embodiment may comprise a first node and a second node. The first node may comprise circuitry that may include a circuit card and a circuit board. The circuit board may include a circuit card slot that may be capable of coupling the circuit card to the circuit board. The circuitry may be capable of, in response, at least in part, to receipt at the first node of a request issued from a second node to change from one mode of operation to another mode of operation, selecting an amplitude of a signal to be propagated between the first node and the second node during the another mode of operation, and selecting a frequency of a clock signal to be supplied in the first node during the another mode of operation. The selected amplitude of the signal may be different from another amplitude of the signal during the one mode of operation. The selected frequency of the clock signal may be different from another frequency of the clock signal during the one mode of operation.

These features of this system embodiment may permit the amount of electrical power that may be consumed, and the amount of heat that may be dissipated by the system embodiment if the system embodiment is operating in the another mode of operation to be less than the amount of electrical power that may be consumed, and the amount of heat that may be dissipated by the system embodiment if the system embodiment is operating in the one mode of operation. Advantageously, this may permit the amount of electrical power that may be consumed, and the amount of heat that may be dissipated by CPE and/or a DSL network comprising this system embodiment, during a period of relatively reduced exchange of data and/or commands between a CO and the CPE in such a network, to be less than the amount of electrical power that may be consumed, and the amount of heat that may be dissipated by a CPE and/or DSL network according to the prior art. Further advantageously, if the system embodiment is powered, at least in part, by one or more batteries (e.g., if the system embodiment is comprised in a battery powered laptop or notebook computer system), this may conserve battery life, and permit the amount of time that the system embodiment may be powered by the one or more batteries, without recharging, to be extended compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications, variations, alternatives, and equivalents are possible within the scope of the claims. For example, without departing from this embodiment, clock generator circuitry 49 may be capable of generating multiple different clock signals that may have differing frequencies selected based at least in part upon one or more values that may be stored in memory 46, and gating circuitry 54 may be capable of selectively permitting or preventing, for each respective clock signal, supply of the respective clock signal to respective circuitry that may be comprised in circuitry 40, as selected by one or more respective values that may be stored in memory 48. Advantageously, this may permit clock frequencies having respective frequencies, that may be mutually different from each other and may be selected depending at least in part upon the mode of operation of circuitry 40, to be selectively supplied or prevented from being supplied to respective circuitry in circuitry 40.

Other and/or additional modifications, variations, alternatives, and equivalents are also possible. Accordingly, the claims are intended to cover all such modifications, variations, alternatives, and equivalents.

What is claimed is:

1. A method comprising:
   in response, at least in part, to receipt at a first node of a request issued from a second node to change from one mode of operation to another mode of operation:
      selecting an amplitude of a signal to be propagated between the first node and the second node during the another mode of operation, the amplitude of the signal being different from another amplitude of the signal during the one mode of operation; and
      selecting a frequency of a clock signal to be supplied in the first node during the another mode of operation, the frequency being different from another frequency of the clock signal during the one mode of operation.

2. The method of claim 1, wherein:
   the selecting of the amplitude of the signal to be propagated between the first node and second node during the another mode of operation and the selecting of the frequency of the clock signal to be supplied during the another mode of operation are carried out, at least in part, at the first node.

3. The method of claim 1, wherein:
the amplitude of the signal to be propagated between the first node and the second node during the another mode of operation is less than the another amplitude;
the frequency of the clock signal to be supplied during the another mode of operation is less than the another frequency of the clock signal during the one mode of operation;
the first node comprises circuitry; and
the clock signal is supplied to the circuitry during the one mode of operation and the another mode of operation.

4. The method of claim 1, wherein:
the first node comprises digital subscriber line (DSL) modem circuitry that is capable of being coupled to the second node via a subscriber line; and
the signal that is to be propagated during the another mode of operation is to be propagated via the subscriber line.

5. The method of claim 4, wherein:
a central office (CO) comprises the second node; and
customer premises equipment (CPE) comprises the modem circuitry.

6. The method of claim 4, wherein:
prior to the receipt of the request, the clock signal is supplied to the modem circuitry; and
the method further comprises, after the receipt of the request, preventing the clock signal from being supplied to the modem circuitry.

7. The method of claim 6, further comprising:
after the selecting of the frequency of the clock signal to be supplied during the another mode of operation, permitting the clock signal to be supplied to the modem circuitry.

8. An apparatus comprising:
circuitry that is capable of, in response, at least in part, to receipt at a first node of a request issued from a second node to change from one mode of operation to another mode of operation:
  selecting an amplitude of a signal to be propagated between the first node and the second node during the another mode of operation, the amplitude of the signal being different from another amplitude of the signal during the one mode of operation; and
  selecting a frequency of a clock signal to be supplied in the first node during the another mode of operation, the frequency being different from another frequency of the clock signal during the one mode of operation.

9. The apparatus of claim 8, wherein: the first node comprises, at least in part, the circuitry.

10. The apparatus of claim 8, wherein:
the amplitude of the signal to be propagated between the first node and the second node during the another mode of operation is less than the another amplitude;
the frequency of the clock signal to be supplied during the another mode of operation is less than the another frequency of the clock signal during the one mode of operation;
the first node comprises the circuitry; and
the clock signal is supplied to the circuitry during the one mode of operation and the another mode of operation.

11. The apparatus of claim 8, wherein:
the first node comprises a digital subscriber line (DSL) modem that is capable of being coupled to the second node via a subscriber line, the subscriber line being to propagate the signal that is to be propagated during the another mode of operation.

12. The apparatus of claim 11, wherein:
a central office (CO) comprises the second node; and
customer premises equipment (CPL) comprises the modem.

13. The apparatus of claim 11, wherein:
prior to the receipt of the request, the clock signal is supplied to the modem; and
the circuitry is also capable of, after the receipt of the request, preventing the clock signal from being supplied to the modem.

14. The apparatus of claim 13, wherein:
the circuitry is also capable of, after selecting the frequency of the clock signal to be supplied during the another mode of operation, permitting the clock signal to be supplied to the modem circuitry.

15. A memory having stored thereon instructions that when executed by a machine result in the following:
in response, at least in part, to receipt at a first node of a request issued from a second node to change from one mode of operation to another mode of operation:
  selecting an amplitude of a signal to be propagated between the first node and the second node during the another mode of operation, the amplitude of the signal being different from another amplitude of the signal during the one mode of operation; and
  selecting a frequency of a clock signal to be supplied in the first node during the another mode of operation, the frequency being different from another frequency of the clock signal during the one mode of operation.

16. The memory of claim 15, wherein:
the selecting of the amplitude of the signal to be propagated between the first node and second node during the another mode of operation and the selecting of the frequency of the clock signal to be supplied during the another mode of operation are carried out, at least in part, at the first node.

17. The memory of claim 15, wherein:
the amplitude of the signal to be propagated between the first node and the second node during the another mode of operation is less than the another amplitude;
the frequency of the clock signal to be supplied during the another mode of operation is less than the another frequency of the clock signal during the one mode of operation;
the first node comprises circuitry; and
the clock signal is supplied to the circuitry during the one mode of operation and the another mode of operation.

18. The memory of claim 15, wherein:
the first node comprises digital subscriber line (DSL) modem circuitry that is capable of being coupled to the second node via a subscriber line; and
the signal that is to be propagated during the another mode of operation is to be propagated via the subscriber line.

19. The memory of claim 18, wherein:
a central office (CO) comprises the second node; and
customer premises equipment (CPE) comprises the modem circuitry.

20. The memory of claim 18, wherein:
prior to the receipt of the request, the clock signal is supplied to the modem circuitry; and
the instructions when executed by the machine also result in, after the receipt of the request, preventing the clock signal from being supplied to the modem circuitry.

21. The memory of claim 20, wherein the instructions when executed by the machine also result in:

after the selecting of the frequency of the clock signal to be supplied during the another mode of operation, permitting the clock signal to be supplied to the modem circuitry.

22. A system comprising:

a first node comprising circuitry that includes a circuit card and a circuit board, the circuit board including a circuit card slot that is capable of coupling the circuit card to the circuit board; and a second node;

the circuitry being capable of, in response, at least in part, to receipt at the first node of a request issued from a second node to change from one mode of operation to another mode of operation:

selecting an amplitude of a signal to be propagated between the first node and the second node during the another mode of operation, the amplitude of the signal being different from another amplitude of the signal during the one mode of operation; and selecting a frequency of a clock signal to be supplied in the first node during the another mode of operation, the frequency being different from another frequency of the clock signal during the one mode of operation.

23. The system of claim 22, wherein:

the circuit board comprises a bus and a host processor coupled to the bus; and the slot is also coupled to the bus.

24. The system of claim 23, wherein:

the circuit card comprises:

modem circuitry capable of being coupled to the second node via a subscriber line; and clock generator circuitry that is capable of generating the clock signal.

25. The system of claim 24, wherein:

the system further comprises memory to store one or more values indicative, at least in part, of the frequency of the clock signal to be supplied during the another mode of operation; and the clock generator circuitry is capable of generating the clock signal based at least in part upon the one or more values stored in the memory.

26. The system of claim 25, wherein:

the circuit card comprises the memory.

27. The system of claim 25, wherein:

the circuit card also comprises additional circuitry that is capable of preventing the clock signal from being supplied to the modem circuitry.

\* \* \* \* \*

UNITED STATES PATENT AND TRADEMARK OFFICE
CERTIFICATE OF CORRECTION

PATENT NO.       : 7,606,353 B2                                      Page 1 of 1
APPLICATION NO.  : 10/668137
DATED            : October 20, 2009
INVENTOR(S)      : Anil K. Kumar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1585 days.

Signed and Sealed this

Twelfth Day of October, 2010

David J. Kappos
*Director of the United States Patent and Trademark Office*